United States Patent [19]

Kreuzer et al.

[11] 4,402,129

[45] Sep. 6, 1983

[54] METHOD FOR WINDING THE STATOR OF A THREE PHASE GENERATOR

[75] Inventors: Helmut Kreuzer; Manfred Frister, both of Schwieberdingen, Fed. Rep. of Germany

[73] Assignee: Robert Bosch GmbH, Stuttgart, Fed. Rep. of Germany

[21] Appl. No.: 240,388

[22] Filed: Mar. 4, 1981

[30] Foreign Application Priority Data

Mar. 4, 1980 [DE] Fed. Rep. of Germany ...... 3008212

[51] Int. Cl.³ .............................................. H02K 15/00
[52] U.S. Cl. ..................................... 29/596; 310/184
[58] Field of Search ................. 29/596; 310/202, 206, 310/180, 184, 207, 208; 242/1.1 R, 1.1 A, 1.1 E

[56] References Cited

U.S. PATENT DOCUMENTS 3,044,150 7/1962 Higley ................................. 29/596
3,760,493 9/1973 Snively ............................... 29/596
4,351,102 9/1982 Grozinger ........................... 29/596

FOREIGN PATENT DOCUMENTS 54-201 4/1979 Japan ................................... 29/596

Primary Examiner—Carl E. Hall
Assistant Examiner—P. W. Echols
Attorney, Agent, or Firm—Frishauf, Holtz, Goodman & Woodward

[57] ABSTRACT

The stator of a three phase AC generator is wound automatically. A first set of partial windings consitutes the first winding. Each of the partial windings has at least one turn. The first partial winding is wound in slots 1 and 4 in the clockwise direction, the second in slots 7 and 4 in the counterclockwise direction, etc. Before the second partial winding of the first set is wound, the first partial windings of the second and third phase are wound in slots 2 and 5 and 3 and 6, respectively. Similarly, after the counterclockwise winding in slots 4 and 7, the second partial windings of the second and third phase are wound in the counterclockwise direction in slots 8 and 5 and 9 and 6, respectively. This procedure is repeated until all slots are filled. If the same winding profile is to be maintained throughout, the part of the first partial windings associated with the first, second and third phase to be inserted in slots 1, 2, 3, respectively, is left out of the slots until the last partial winding of the phases has been wound. The loose ends of the first partial windings are then pushed into the respective slots. After the partial windings are connected to each other to form the first, second and third main windings, the winding starts and the winding ends of these main windings are connected together to form the desired electrical configuration. In this connection, the start and end of the second winding are electrically interchanged, to create the required 120° phase difference between all the windings.

4 Claims, 4 Drawing Figures

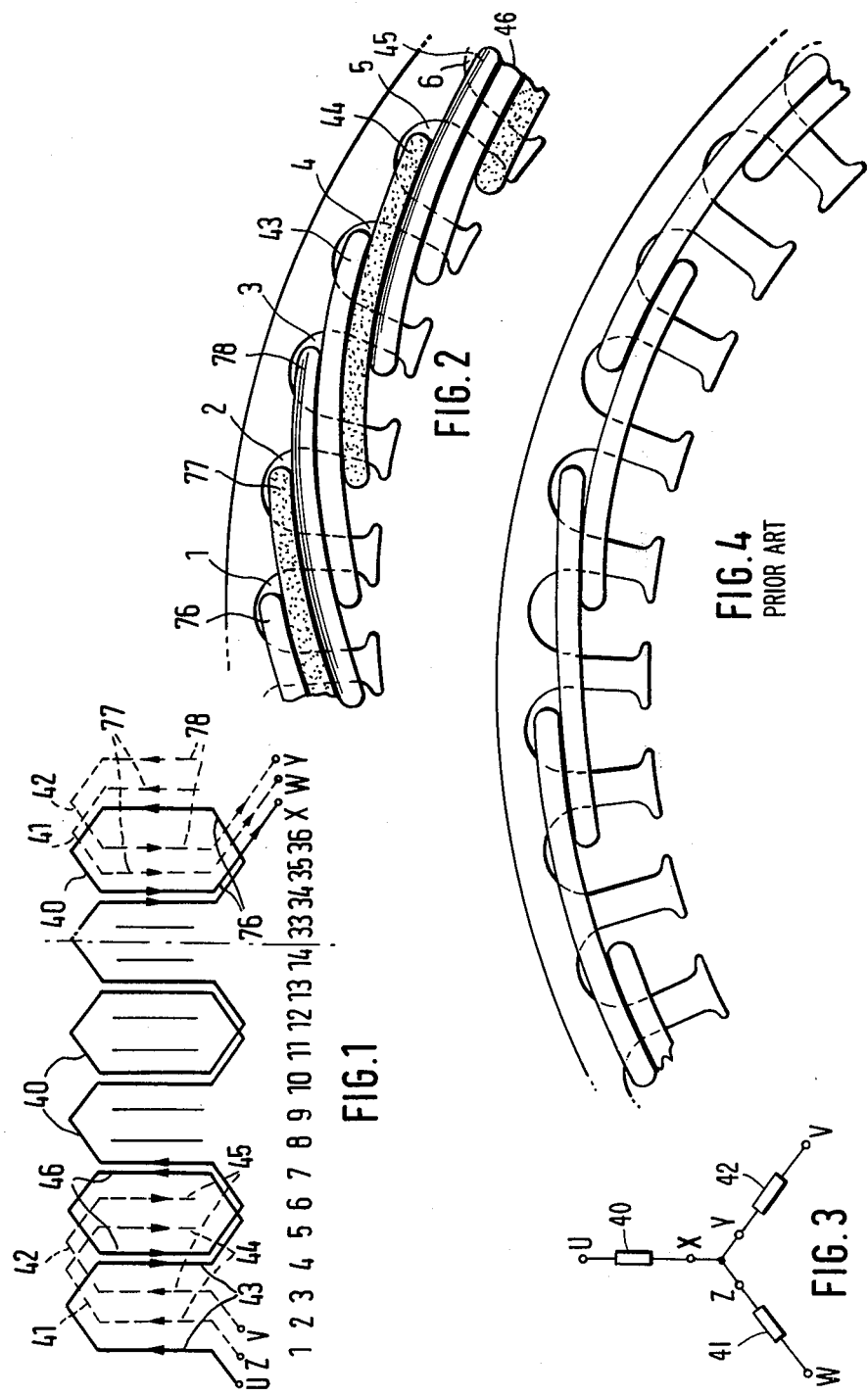

METHOD FOR WINDING THE STATOR OF A THREE PHASE GENERATOR

CROSS-REFERENCE TO RELATED APLICATIONS AND PUBLICATIONS

U.S. application Ser. No. 937,913 filed Aug. 30, 1978, now U.S. Pat. No. 4,351,102, Grozinger, assigned to the assignee of this application.

The present invention relates to a winding method for the stator of a three phase AC generator and, more particularly, to automatic winding of such a stator.

BACKGROUND OF THE INVENTION

The space available in the slots of a stator of a three phase AC generator is more highly utilized than in either a wave or a lap winding when a winding method disclosed in the referenced U.S. Pat. No. 4,351,102, Grozinger, is used. An even better space utilization factor can be achieved by manual winding of wires in the slots of two layers.

THE INVENTION

It is an object to provide an automatic winding method achieving a higher space utilization factor than any of the well known automatic methods. It is a particular objective of the present invention to achieve this optimum space utilization factor while using relatively small partial windings.

In accordance with the present invention, each of the phase windings, e.g., the first, second and third winding for the first, second and third phase of the AC generator comprise, respectively, a first, second and third plurality of partial windings. The first partial winding of the first phase is wound in clockwise direction and consists of one loop, two empty slots being left between the slots filled by the loop. The next partial winding of the first phase is wound in counterclockwise direction from the seventh back to the fourth slot.

In accordance with a feature of the invention, the first partial windings of the second and third phase are wound in clockwise direction in slots 2 and 5, and 3 and 6, respectively, before the second partial winding of the first phase is wound. After the winding of the second partial winding of the first phase in counterclockwise direction, the second partial winding of the second and third phases are wound in like manner in counterclockwise direction in slots 8 and 5, and 9 and 6, respectively. This winding method is continued until the second partial winding of each phase has been wound. The winding starts and the winding ends of each of the main windings constituted by all of the associated partial windings are then connected together so that the desired electrical configuration such as, for example, a star connection is formed, as is well known.

DRAWINGS DESCRIBING A PREFERRED EMBODIMENT

FIG. 1 is a schematic diagram illustrating the winding method of the present invention;

FIG. 2 shows the winding profile, i.e., the position of the partial windings in the slot in which the phase winding for phase 1 is shown blank; the phase winding for phase 2 is shown stipped; and the phase winding for phase 3 is shown lined;

FIG. 3 illustrates the electrical configuration of the AC generator; and

FIG. 4 illustrates the position of the partial windings in the slot in the prior art arrangement.

DESCRIPTION OF THE PREFERRED EMBODIMENT

In the winding scheme shown in FIG. 1, a twelve pole AC stator having thirty-six slots is assumed. This results in twelve partial windings per phase. For the sake of simplicity, only slots 1-14 and slots 33-36 are shown. Further, in order to simplify the presentation, only one winding 40 of one phase is shown, in clear in FIG. 2 in its entirety. The other two windings, 41 and 42, stippled and lined in FIG. 2 which are associated with the two remaining phases are illustrated by broken lines indicating their start and their end only. The winding process proceeds as follows:

It is started with first winding 40. A first partial winding 43 is wound into slots 1 and 4 in clockwise direction. Thereafter, the first partial windings 44 and 45 of the two windings 41 and 42, respectively, are wound into slots 2 and 5, and 3 and 6, respectively. Thereafter, the second partial winding 46 of winding 40 is wound into slots 4 and 7 in that order, i.e. in the counterclockwise direction. The corresponding partial windings of windings 41 and 42 are then correspondingly wound. This process continues, that is, for each winding, partial windings are alternately wound in the clockwise and counterclockwise direction, the three corresponding partial windings associated with the three phases being wound one after the other. For simplifying the illustration, each partial winding is shown with only one turn. The number of turns, of course, is arbitrary and depends upon the electrical as well as the space requirements. The above-described winding method results in the arrangement of the partial windings shown in FIG. 2, that is, these partial windings lie next to each other at a slant, overlapping, so that a very good space utilization factor results.

The winding starts of windings 40-42 are denoted by U,Z and V, respectively, the respective ends being denoted by X,W,Y. The individual windings are then connected in a well known manner, for example in the star connection shown in FIG. 3. It is customary to connect the winding ends X,Y,Z to the common point of the star. By electrically interchanging the winding end and winding start of the second winding, namely winding 41 which starts in slot 2, an electrical angle of 120° is created among all three windings. The center point of the star thus consists of the winding start of the second and the winding ends of the third and first windings.

The same overlapping shingled winding profile can be maintained throughout in this manner. Specifically, at the start of the winding process, the first partial windings 43-45 are only inserted into slots 4 and 6. The opposite sides of these partial windings are at first left outside of slots 1-3. After the winding of the last partial windings 76-78 (FIGS. 1,2) has been completed, the free sides of partial windings 43-45, previously left out of the slots, are pushed into the slots above the partial windings 76-78, in a anner well known for winding multi-layer windings. The winding profile will then be the same throughout. If a small variation in the profile can be tolerated, then the winding method can be simplified somewhat by inserting only one side of winding 43 or of windings 43 and 44.

FIG. 4 illustrates the winding arrangement resulting from a known winding method. It is clear that the space utilization factor is poor. A generator wound by the conventional method would thus require a greater volume for the same power output.

Various changes and modifications may be made within the scope of the inventive concepts.

We claim:

1. Method for winding a first, second and third (40,41,42) winding, respectively, associated with the first, second and third phase of a three-phase a-c generator on a stator having a plurality of slots, comprising the steps of winding a first partial winding (43) of a first phase, forming part of said first winding (40), in a first direction (clockwise) in a first and fourth slot (1, 4) of the stator, leaving empty second and third intervening slots (2, 3);

then winding a first partial winding (44) of a second phase and forming part of the second winding (41) in the first direction in the second and a fifth slot (2, 5);

then winding a first partial winding (45) of a third phase and forming part of the third winding (42) in the first direction in the third slot (3) and a sixth slot (6);

then continuing to wind the first winding (40) by winding, in opposite direction (counterclockwise), and starting from the seventh slot back to the fourth slot, the second partial winding (46) of said first winding (40);

then continuing, in like manner, winding the second partial windings of each of the second and third windings (41, 42) in said opposite direction, backwardly, from respectively the eighth and ninth slots to the fifth and sixth slots;

and connecting the winding starts and winding ends of said first, second and third windings to each other to form a prdetermined three-phase configuration.

2. Method according to claim 1, wherein said step of connecting said winding starts and ends of said first, second and third windings comprises connecting the winding end (Z) of said second winding (41) to the winding starts (X, Y) of said first and third windings (40, 42).

3. Method according to claim 1, wherein each of the last partial windings of the respective first, second and third windings is placed underneath one of said first partial windings of the first, second and third windings.

4. Method according to claim 1, wherein each of said first partial windings includes a first and second leg, to be inserted, respectively, into a first, lower-numbered and a second, higher-numbered slot;

and wherein the first leg is pushed into the first, lower-numbered slot only after winding of the last partial winding has been completed to provide for overlap of said first leg of the first partial winding over the last-wound last partial winding.

* * * * *